(12) United States Patent
Ogawa

(10) Patent No.: US 7,190,652 B2
(45) Date of Patent: Mar. 13, 2007

(54) PULSE SHAPE MODULATION AND INFORMATION RECORDING AND REPRODUCING TECHNIQUE USING PULSED LASER BEAM

(75) Inventor: Ippei Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 619 days.

(21) Appl. No.: 10/739,089

(22) Filed: Dec. 19, 2003

(65) Prior Publication Data

US 2004/0165509 A1    Aug. 26, 2004

(30) Foreign Application Priority Data

Dec. 26, 2002   (JP)   ............... 2002-375779

(51) Int. Cl.
   *G11B 7/005*   (2006.01)
(52) U.S. Cl. .................. 369/59.15; 369/59.12
(58) Field of Classification Search ...... None
   See application file for complete search history.

(56) References Cited

U.S. PATENT DOCUMENTS

| | | | |
|---|---|---|---|
| 5,898,661 A * | 4/1999 | Morimoto | ............. 369/110.03 |
| 6,280,810 B1 | 8/2001 | Nakamura et al. | |
| 6,388,978 B1 | 5/2002 | Ogawa et al. | |
| 6,497,935 B1 | 12/2002 | Ogawa | |
| 6,562,432 B2 | 5/2003 | Ogawa et al. | |
| 6,643,239 B2 * | 11/2003 | Nakajo | ............. 369/53.26 |
| 6,754,158 B1 * | 6/2004 | Kobayashi et al. | ...... 369/59.11 |
| 2003/0072241 A1 | 4/2003 | Ogawa | |
| 2003/0188095 A1 * | 10/2003 | Fan et al. | ............. 711/112 |

FOREIGN PATENT DOCUMENTS

| | | |
|---|---|---|
| JP | 08-007277 | 1/1996 |
| JP | 11-66698 | 3/1999 |
| JP | 11-175976 | 7/1999 |
| JP | 2001-101660 | 4/2001 |
| JP | 2003-030833 | 1/2003 |
| JP | 2003-242645 | 8/2003 |

* cited by examiner

*Primary Examiner*—William Korzuch
*Assistant Examiner*—Joseph Haley
(74) *Attorney, Agent, or Firm*—Dickstein Shapiro LLP

(57) ABSTRACT

In the disclosed pulse shape modulation method, an amplitude modulation gain for a reproduced signal from an information recording medium that makes the jitter of the reproduced signal become the minimum is specified. Then, it is determined whether the amplitude modulation gain corresponding to the minimum jitter resides within a prescribed range. If the amplitude modulation gain corresponding to the minimum jitter is outside the prescribed range, the pulse shape of the pulsed laser beam is modulated.

18 Claims, 12 Drawing Sheets

PULSE SHAPE MODULATION AND INFORMATION RECORDING AND REPRODUCING TECHNIQUE USING PULSED LASER BEAM

BACKGROUND OF THE INVENTION

1. Field of the Invention

The present invention generally relates to pulse shape modulation and an information recording and reproducing technique, and more specifically, to a pulse shape modulating technique for modulating a pulse shape when recording and reproducing information in and from a data recording medium using a pulsed laser beam.

2. Description of Related Art

Remarkable progress of personal computer functionality in recent years has allowed the personal computer to process audio-visual information, such as music and video images. Since the data volume of such audio-visual information is very large, optical disks, such as compact disks (CDs) and digital versatile disks (DVDs) have been attracting attention as large-volume information recording media. As the cost and price of such optical disks are reduced, optical disk apparatuses for recording and reproducing information in and from optical disks are spreading among users, and are increasingly used as components of computer peripheral equipment.

With an optical disk apparatus, a laser beam is guided onto the recording side of an optical disk, in which spiral or concentric tracks are formed, to form a fine spot on the disk in order to record and erase information in and from the disk. The information recorded in the optical disk is reproduced based on the light reflected from the recording side of the disk. In general, the optical disk apparatus is provided with an optical pickup device to emit a laser beam onto the recording side of the information recording medium and receive the reflected light from the recording side.

Generally, an optical pickup device includes a light source for emitting a laser beam at a prescribed light-emitting (output) power; a lens system for guiding the laser beam emitted from the light source onto the recording side of the information recording medium, as well as guiding the laser beam reflected from the recording side to a light receiving position; and a light receiving element arranged at the light receiving position.

In an optical disk, there are two regions provided, a mark (pit) region and a space (land) region having different reflectances from each other. Information is recorded on the optical disk by means of the respective lengths of the mark and the space and the combination thereof. The light emission power of the light source is adjusted so that the mark and the space are formed at predetermined locations in the optical disk during the recording operation.

For example, when a mark is formed in a recordable optical disk (hereinafter, referred to as a "dye-type disk" for convenience), such as CD-recordable (CD-R), DVD-recorddable (DVD-R), and DVD+recordable (DVD+R) having a recording layer containing an organic dye, the light emission power is raised to heat and melt the dye of the recording layer, thereby deforming or altering the nature of the substrate that is in contact with the melting portion of the recording layer. On the other hand, when forming a space, the light emission power is reduced as low as that in the reproducing operation, so as not to cause the substrate to deform or be altered in nature. As a result of the control of exposure power, the reflectance of the mark region is lower than that in the space region.

Examples of adjustment of the light-emission power are illustrated in FIGS. 1A through 1C. FIG. 1A illustrates adjustment of light emission power for a dye type CD, in accordance with writing data WD generated from recording data. The light emission power LP is raised to level Pw in order to form a mark in the disk, corresponding to the mark section M of the writing data WD. The light emission power is decreased to level Pr to form a space, corresponding to the space section S of the writing data WD. In this manner, the light emission power of the light source is regulated so as to pulse 4 light beam. The light emission power control shown in FIG. 1A is called single pulse recording control. Symbol Pw is referred to as peak power (or recording power), and Pr is referred to as bias power (or reproducing power). The peak power section of the light emission pulse is also referred to as a heating pulse, and the bias power section of the pulse is referred to as a cooling pulse.

FIG. 1B illustrates adjustment of light emission power for a dye type DVD, in which the light emission power produced to form a mark is divided into multiple pulses for the purpose of removing adverse effects of heat accumulation. Several heating pulses are given to form a single mark region. This type of light emission control is called multi-pulse recording control. Under multi-pulse recording control, the rule for rendering the light emission power into multiple pulses is called a recording strategy. Among the multiple pulses used to form a mark, the first heating pulse Pt is referred to as a leading heating pulse, and the last heating pulse Pf is referred to as a final heating pulse.

FIG. 1C illustrates adjustment of light emission power for rewritable disks with a special alloy contained in its recording layer (referred to as a "phase-change disk for convenience), including CD-rewritable (CD-RW), DVD-rewritable (DVD-RW), and DVD+rewritable (DVD+RW). When forming a mark in the rewritable disk, the special alloy is heated up to the first temperature using a laser beam, and then the light emission power is reduced for rapid cooling of the special alloy to make the special alloy amorphous. When forming a space, the special alloy is heated up to a second temperature that is lower than the first temperature and then slowly cooled to make the special alloy crystal. Accordingly, the reflectance of the mark region becomes less than that of the space region. In the example shown in FIG. 1C, multi-pulse recording control is employed for the purpose of removing the influence of heat accumulation. The light emission power Pe for forming the space is called erase power.

The above-described recording power and the recording strategy are the principal recording conditions that greatly affect the recording quality, and therefore, it is important to select the optimum recording power and the recording strategy for each optical disk in which data are to be recorded. JPA 11-66698 discloses a technique for selecting the optimum recording power. In this publication, several times of recording are conducted at various levels of recording power, and a power level that makes the jitter measured from the reproduced signal become minimum is selected as the optimum recording power.

However, when forming marks having the same length in writing data, the length of the actually formed marks may vary, depending on the lengths of the space located immediately before the mark (referred to as a "front space") and the space located immediately after the mark (referred to as a "back space"). This is because radiant heat effect varies depending on the length of the space. Since the influence of heat accumulation in forming a mark also changes due to the recording power and the light emission time, the mark formed in the disk may not have the designed or expected length, depending on the size of the mark. This causes the quality of the reproduced signal to vary, and prevents accurate reproduction of information from the disk.

SUMMARY OF THE INVENTION

It is therefore an object of the present invention to overcome the above-described problem, and to provide a pulse shape modulation method for producing an optimum light emission pulse suitable for stable recording operations and achieving satisfactory recording quality.

It is another object of the present invention to provide an information recording/reproducing apparatus that can perform stable recording operations resulting in excellent recording quality.

To achieve the objects, in one aspect of the invention, a pulse shape modulation method for modulating a pulse shape of a pulsed laser beam used in recording operations for an information recording medium is provided. In this method, an amplitude modulation gain for a reproduced signal from the information recording medium that makes the jitter become the minimum is specified. Then, it is determined whether the amplitude modulation gain corresponding to the minimum jitter resides within a prescribed range. If the amplitude modulation gain corresponding to the minimum jitter is outside the prescribed range, the pulse shape of the pulsed laser beam is modulated.

With this method, the pulse shape of the pulsed laser beam emitted from the light source during the recording operation is modulated such that a satisfactory reproduced signal with much less degradation is acquired in a stable manner during the reproducing operation.

For example, if the amplitude modulation gain is greater than the upper limit of the prescribed range, at least one of the shapes of a pulse used to form a shortest mark region and a pulse used to form a longest mark region is modulated.

When modulating the shape of the pulse used to form the shortest mark region, the rising timing of the pulse is advanced.

When modulating the shape of the pulse used to form the longest mark region, the rising timing of the pulse is delayed.

On the other hand, if the amplitude modulation gain is less than the lower limit of the prescribed range, at least one of the shapes of a pulse used to form a shortest mark region and a pulse used to form a longest mark region is modulated.

When modulating the shape of the pulse used to form the shortest mark region, the falling timing of the pulse is advanced.

When modulating the shape of the pulse used to form the longest mark region, the falling timing of the pulse is delayed.

In an alternative, if the amplitude modulation gain is less than the lower limit of the prescribed range, at least one of the shape of a pulse used to form a mark region located immediately after a shortest space region and the shape of a pulse used to form a mark region located immediately after a longest space region may be modulated.

When modulating the shape of the pulse located immediately after the shortest space region, the rising timing of the pulse is delayed.

When modulating the shape of the pulse located immediately after the longest space region, the rising timing of the pulse is advanced.

In another alternative, if the amplitude modulation gain is less than the lower limit of the prescribed range, at least one of the shape of a pulse used to form a mark region located immediately before a shortest space region and the shape of a pulse used to form a mark region located immediately before a longest space region may be modulated.

When modulating the shape of the pulse located immediately before the shortest space region, the falling timing of the pulse is advanced.

When modulating the shape of the pulse located immediately before the longest space region, the falling timing of the pulse is delayed.

In another aspect of the invention, an information recording method for recording information in an information recording medium using a pulsed laser beam is provided. This method includes: specifying an amplitude modulation gain for a reproduced signal of test data from the information recording medium that makes the jitter the minimum; determining whether the amplitude modulation gain corresponding to the minimum jitter resides within a prescribed range; modulating the pulse shape of the pulsed laser beam when the amplitude modulation gain corresponding to the minimum jitter is outside the prescribed range; and recording the information in the information recording medium using the pulse modulated laser beam.

In still another aspect of the invention, an information recording and reproducing apparatus for recording information in an information recording medium using a pulsed laser beam is provided. The apparatus includes a reproduced signal processing circuit that acquires an amplitude modulation gain for a reproduced signal from the information recording medium that makes the jitter of the reproduced signal become the minimum, a laser control circuit that modulates a pulse shape of the pulsed laser beam when the amplitude modulation gain corresponding to the minimum jitter is not within a prescribed range, and an optical pickup that records the information in the information recording medium using the pulse-modulated laser beam.

With this information recording and reproducing apparatus, when the amplitude modulation gain for the reproduced signal corresponding to the minimum jitter is not within the prescribed range, the pulse shape of the pulsed laser beam is modulated such that a satisfactory reproduced signal with lesser degradation is acquired in a stable manner. Since the recording operation is carried out using the pulse shape modulated laser beam, the recording quality can be improved.

BRIEF DESCRIPTION OF THE DRAWINGS

Other objects, features, and advantages of the present invention will become more apparent from the following detailed description when read in conjunction with the accompanying drawings, in which:

FIG. 1A through FIG. 1C illustrate adjustment of light emission power, in which FIG. 1A is an example of single pulse recording control employed in a dye type disk, FIG. 1B is an example of multi-pulse recording control employed in a dye type disk, and FIG. 1C is an example of multi-pulse recording control employed in a disk of a phase change type;

DETAILED DESCRIPTION OF THE INVENTION

The preferred embodiments of the present invention are described below with reference to the attached drawings.

Figure 1A:
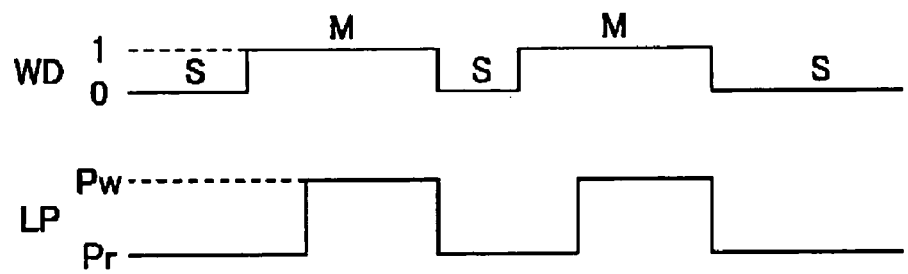
Figure 1B:
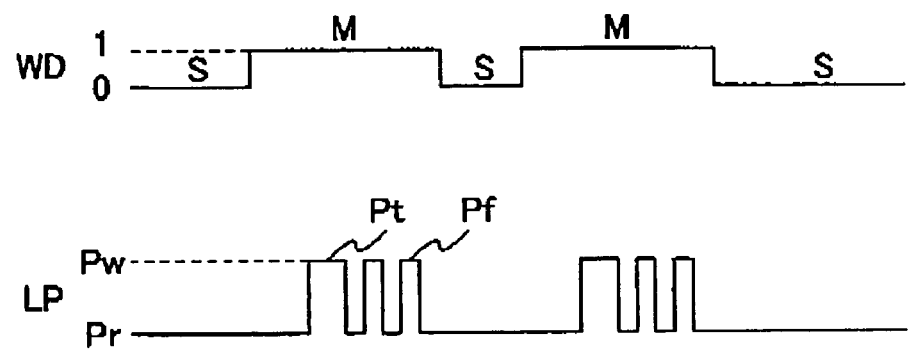
Figure 1C:
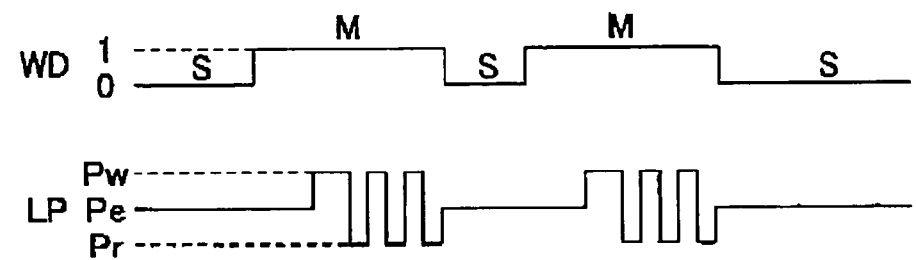
Figure 2:
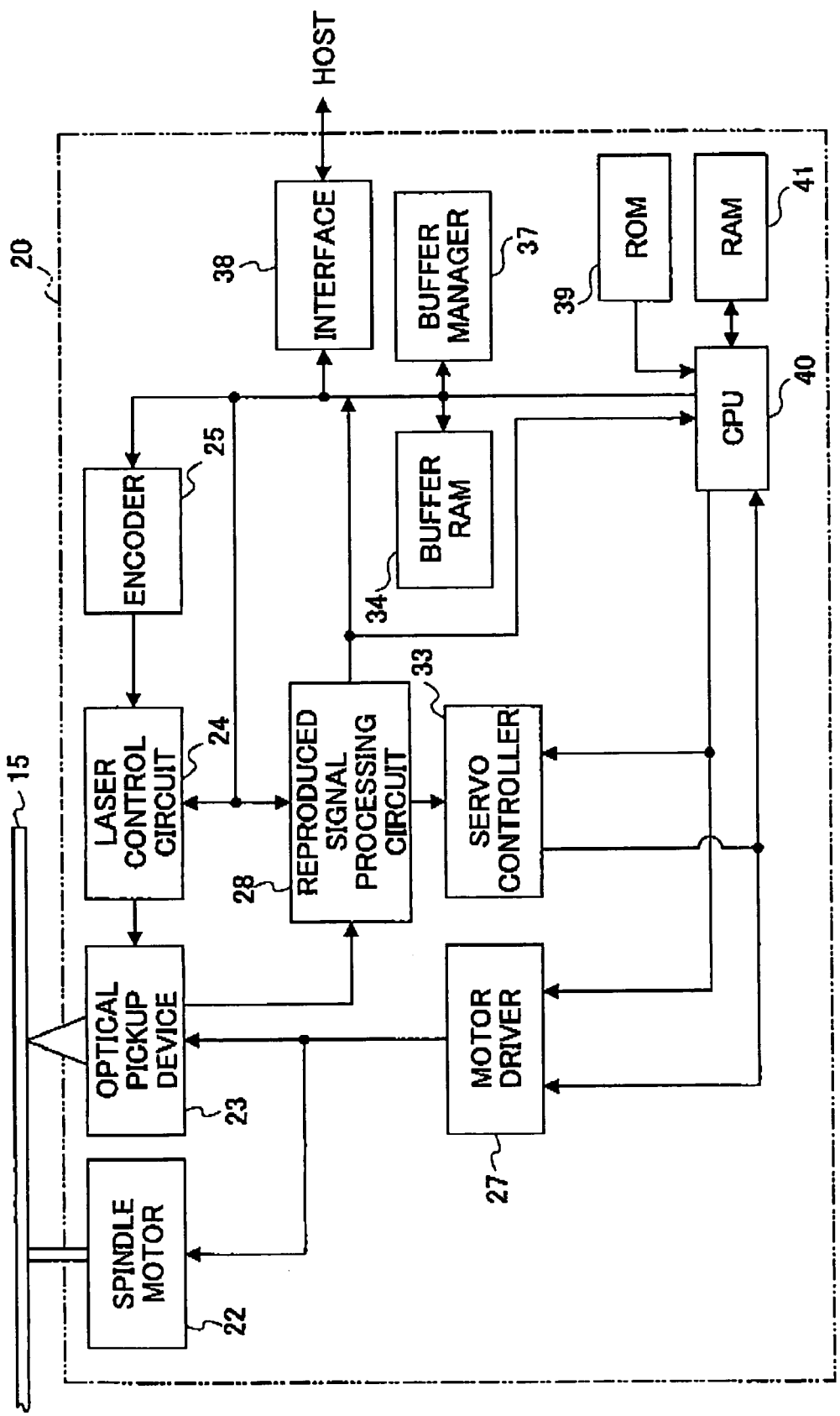
FIG. 2 is a block diagram of an optical disk apparatus according to an embodiment of the invention.

FIG. 2 is a block diagram of an optical disk apparatus, which functions as an information recording and reproducing apparatus, according to an embodiment of the invention.

The optical disk apparatus 20 shown in FIG. 2 includes a spindle motor 22 for rotating an optical disk 15, an optical pickup device 23, a laser control circuit 24, an encoder 25, a motor driver 27, a reproduced signal processing circuit 28, a servo controller 33, a buffer RAM 34, a buffer manager 37, an interface 38, a ROM 39, a CPU 40, and a RAM 41. In FIG. 2, the arrows indicate typical signal flows or data flows, but are not intended to depict all the connections between the respective blocks. In this embodiment, an information recording medium conforming to the DVD+R standard is used as the optical disk 15.

Figure 3:
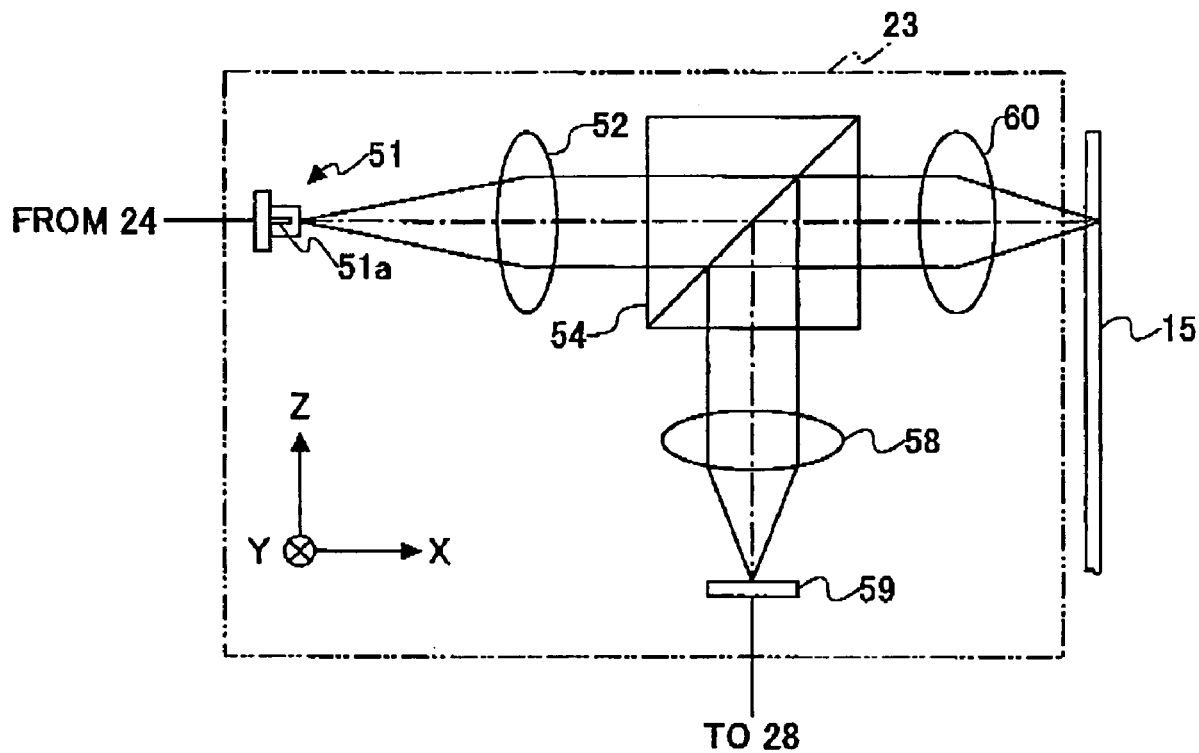
FIG. 3 is a schematic diagram showing the detailed structure of the optical pickup device used in the apparatus shown in FIG. 2.

The optical pickup device 23 guides a laser beam onto the recording side of the optical disk 15, in which spiral or concentric tracks are formed, and it receives the beam reflected from the recording side of the optical disk 15. As illustrated in FIG. 3, the optical pickup device 23 includes a light source unit 51, a collimating lens 52, a beam splitter 54, an object lens 60, a detection lens 58, a light receiving unit 59, and a driving system including, for example, a focusing actuator, a tracking actuator and a seek motor (which are not shown in FIG. 3).

The light source unit 51 has a semiconductor laser 51a that emits light flux with wavelength of 660 nm. In this embodiment, the direction of light flux with the maximum strength emitted from the semiconductor laser 51a is defined as the positive X (+X) direction. The collimating lens 52 is positioned on the +X side of the light source unit 51 to make the light flux emitted from the semiconductor laser 51a substantially parallel.

The beam splitter 54 is positioned on the +X side of the collimating lens 52. The beam splitter 54 splits the light flux reflected and returned from the recording side of the optical disk 15, and guides a portion of the returned light flux in the negative Z (–Z) direction. The object lens 60 is positioned in the +X direction of the beam splitter 54 in order to collect the light flux having passed through the beam splitter 54 so as to form a light spot on the recording side of the optical disk.

The detection lens 58 is positioned on the –Z side of the beam splitter 54 to collect the returned light flux having been split by the beam splitter 54 so as to converge the returned light flux onto the light receiving surface of the light receiving unit 59. The light receiving unit 59 is comprised of a plurality of light receiving elements to output signals, including wobble signals, reproduced data, focus error information, and track error information, as in an ordinary optical pickup device.

In operations of the optical pickup device 23 with the above-described structure, the light flux emitted from the semiconductor laser 51a is collimated by the collimating lens 52 into substantially parallel light, which then passes through the beam splitter 54. The light flux having passed through the beam splitter 54 is collected by the object lens 60 onto the recording side of the optical disk 15 to form a fine spot thereon. The light reflected from the recording side of the optical disk 15 is made parallel by the object lens 60, and then strikes the beam splitter 54. A portion of the returned light flux split by the beam splitter 54 in the –Z direction is received, via the detection lens 58, at the light receiving unit 59. From the light receiving unit 59, a signal corresponding to the quantity of light received at each of the light receiving elements is output to the reproduced signal processing circuit 28.

Figure 4:
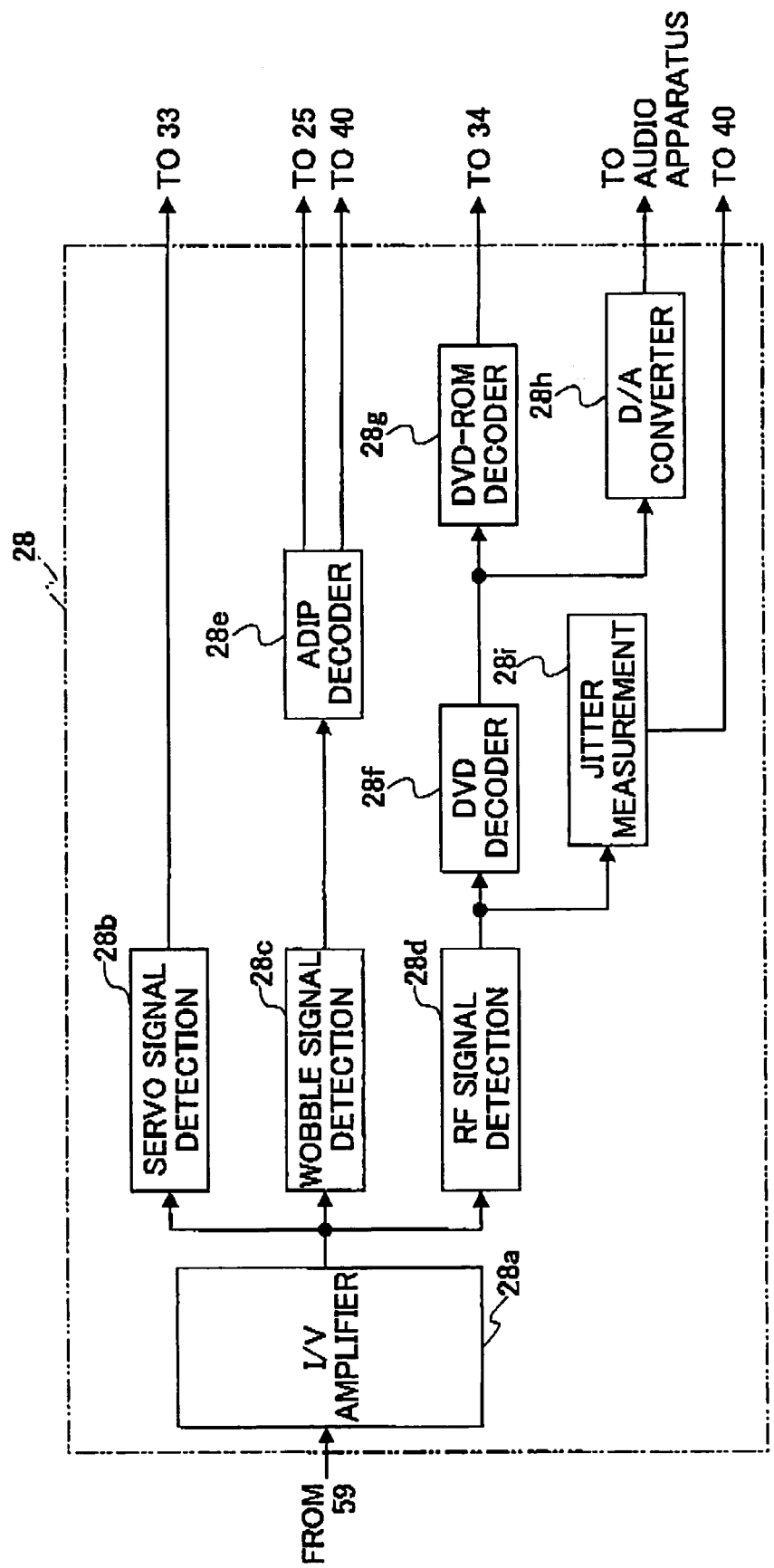
FIG. 4 is a block diagram of the reproduced signal processing circuit used in the apparatus show in FIG. 2.

FIG. 4 illustrates the structure of the reproduced signal processing circuit 28. The reproduced signal processing circuit 28 includes an I/V amplifier 28a, a servo signal detection circuit 28b, a wobble signal detection circuit 28c, an RF signal detection circuit 28d, an ADIP decoder 28e, a DVD decoder 28f, a DVD-ROM decoder 28g, a D/A converter 28h and a jitter measuring circuit 28i.

The I/V amplifier 26a converts the electric current signal output from each of the light receiving elements of the light receiving unit 59 to a voltage signal, and amplifies the voltage signal with a prescribed gain. The servo signal detection circuit 28b detects a servo signal (including a focus error signal and a track error signal), based on the output signal of the I/V amplifier 28a. The servo signal detected by the servo signal detection circuit 28b is output to the servo controller 33. The wobble signal detection circuit 28c detects a wobble signal, based on an output signal of the I/V amplifier 28a. The ADIP decoder 28e extracts ADIP (Address In Pregroove) information and a synchronizing signal from the wobble signal detected by the wobble signal detection circuit 28c. The ADIP information extracted from the wobble signal is output to the CPU 40, while the synchronizing signal is output to the encoder 25.

RF signal detection circuit 28d detects an RF signal based on an output signal of the I/V amplifier 28a. The DVD decoder 28f decodes the RF signal detected by the RF signal detection circuit 28d, and carries out error correction on the decoded signal. The DVD-ROM decoder 28g carries out further error correction on the output signal of the DVD decoder 28f, and then stores the decoded signal as reproduced data in the buffer RAM 34 via the buffer manager 37. If the reproduced data are music data, then the output signal of the DVD decoder 28f is output to the external audio system via the D/A converter 28h. The jitter measuring circuit 28i measures jitter based on the RF signal detected by the RF signal detection circuit 28d, and outputs the measuring result to the CPU 40.

Figure 5:
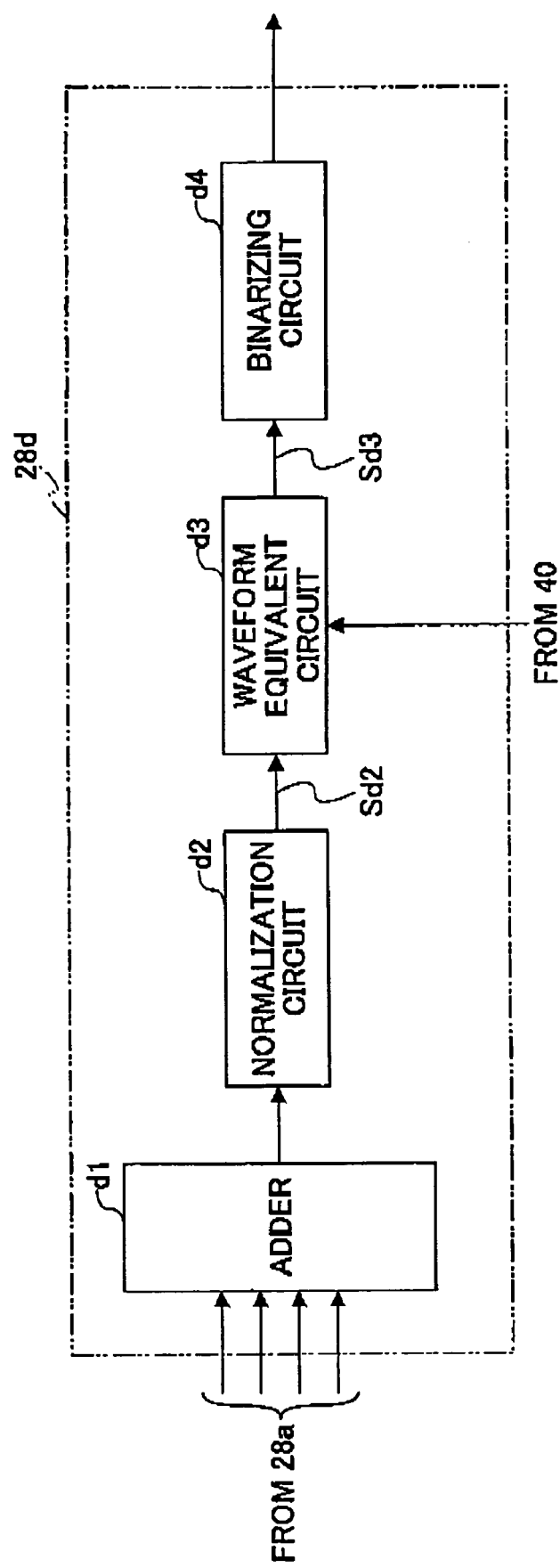
FIG. 5 is a block diagram showing the structure of the RF signal detecting circuit used in the reproduced signal processing circuit shown in FIG. 4.
Figure 6:
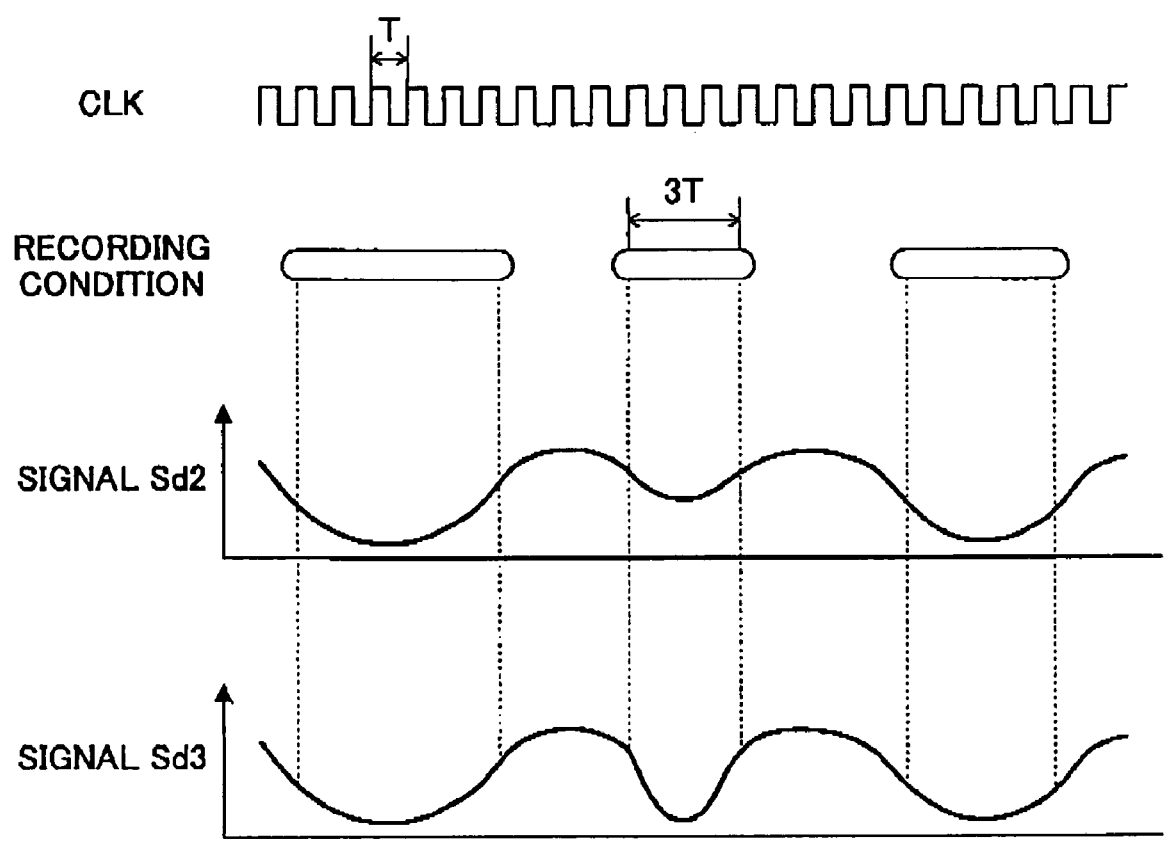
FIG. 6 is a timing chart used to explain the operation of the waveform equivalent circuit shown in FIG. 5.

FIG. 5 illustrates the RF signal detection circuit 28d, which includes an adder d1, a normalization circuit d2, a waveform equivalent circuit d3, and a binarizing circuit d4. The adder d1 adds the output signals of the light receiving elements, which have been converted into voltage signals at the I/V amplifier 28a prior to being input to the adder d1. The normalization circuit d2 carries out prescribed normalization processes on the output signal of the adder d1. The waveform equivalent circuit d3 adjusts the amplitude of the signal component of a predetermined frequency band contained in the output signal Sd2 of the normalization circuit d2, based on the gains selected by the CPU 40. In this embodiment, amplitude adjustment is performed selectively on the signal component corresponding to the mark region with length 3T (where T is the period of a channel clock CLK), as illustrated in FIG. 6. The binarizing circuit d4 comprises a comparator. The binarizing circuit d4 binarizes the output signal Sd3 of the waveform equivalent circuit d3, and outputs the binarization result as the RF signal.

Returning to FIG. 2, the servo controller 33 produces a control signal for correcting the focus offset based on the focus error signal from the reproduced signal processing circuit 28, and another control signal for correcting the track offset based on the track error signal. These control signals are supplied from the servo controller 33 to the motor driver 27.

The motor driver 27 drives the tracking actuator and the focusing actuator of the optical pickup device, based on each control signal supplied from the servo controller 33. In other words, tracking control and focus control are carried out by means of the servo signal detection circuit 28b, the servo controller 33, and the motor driver 27. The motor driver 27 also drives the spindle motor 22 and the seek motor of the optical pickup device, based on instructions of the CPU 40.

The encoder 25 takes the data from the buffer RAM through the buffer manager 37 based on the instruction from the CPU 40, performs 8–16 modulation, and adds error correction codes to create data to be written. Furthermore, the encoder 25 generates a writing signal for writing data in the optical disk 15, based on the data to be written and a prescribed recording strategy. The writing signal is output to the laser control circuit 24 in synch with the synchronizing signal from the reproduced signal processing circuit 28, based on the instructions from the CPU 40.

Figure 7:
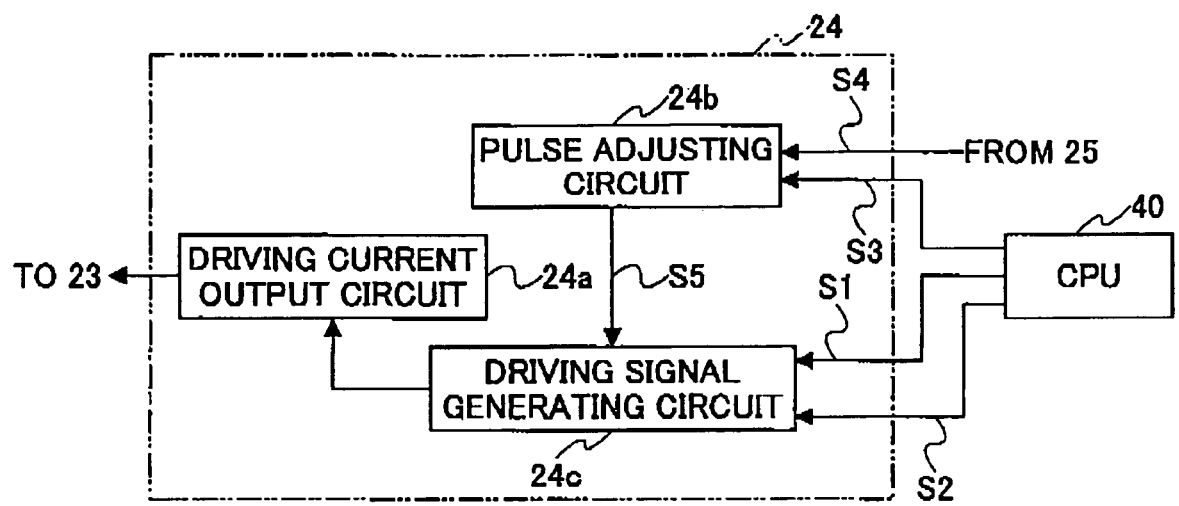
FIG. 7 is a block diagram showing the structure of the laser control circuit shown in FIG. 2.

FIG. 7 illustrates the laser control circuit 24, which includes a driving current output circuit 24a, pulse adjusting circuit 24b, and driving signal generating circuit 24c. The pulse adjusting circuit 24b adjusts the pulse shape for the writing signal S4 input from the encoder 25, based on pulse adjusting signal S3 supplied from the CPU 40 The driving signal generating circuit 24c generates a driving signal for driving the semiconductor laser 51a, based on the pulse-adjusted writing signal S5 output from the pulse adjusting circuit 24b, and the bias current signal S1 and the peak superposing signal S2 supplied from the CPU 40. To be more precise, for the bias level of the writing signal S5, the bias current signal S1 is output as the driving signal, while for the peak level of the writing signal S5, the sum of the bias current signal S1 and the peak superposing signal S2 is output as the driving signal. The driving current output circuit 24a converts the driving signal output from the driving signal generating circuit 24c into driving current, and supplies the driving current to the semiconductor laser 51a.

Again returning to FIG. 2, the interface 38 is a bi-directional communication interface with a host (a personal computer, for example), which is a standardized interface such as ATAPI (AT Attachment Packet Interface) or SCSI (Small Computer System Interface).

The ROM 39 has a program area for storing a program described with codes interpretable by the CPU 40, as well as a data area. When the power source of the optical disk apparatus 20 is turned on, the program stored in the program area of the ROM 39 is loaded in the main memory (not shown). On the other hand, the data area of the ROM 39 stores recording condition information, including a prescribed recording strategy (hereinafter, referred to as "basic recording strategy") and the optimum recording power. A pulse shape modulation table, which is describe below, is also stored in the data area of the ROM 39.

The CPU 40 controls the operations of the above-described components in accordance with the program loaded in the primary memory, and causes the data required for control to be temporarily stored in RAM 41.

Figure 8:
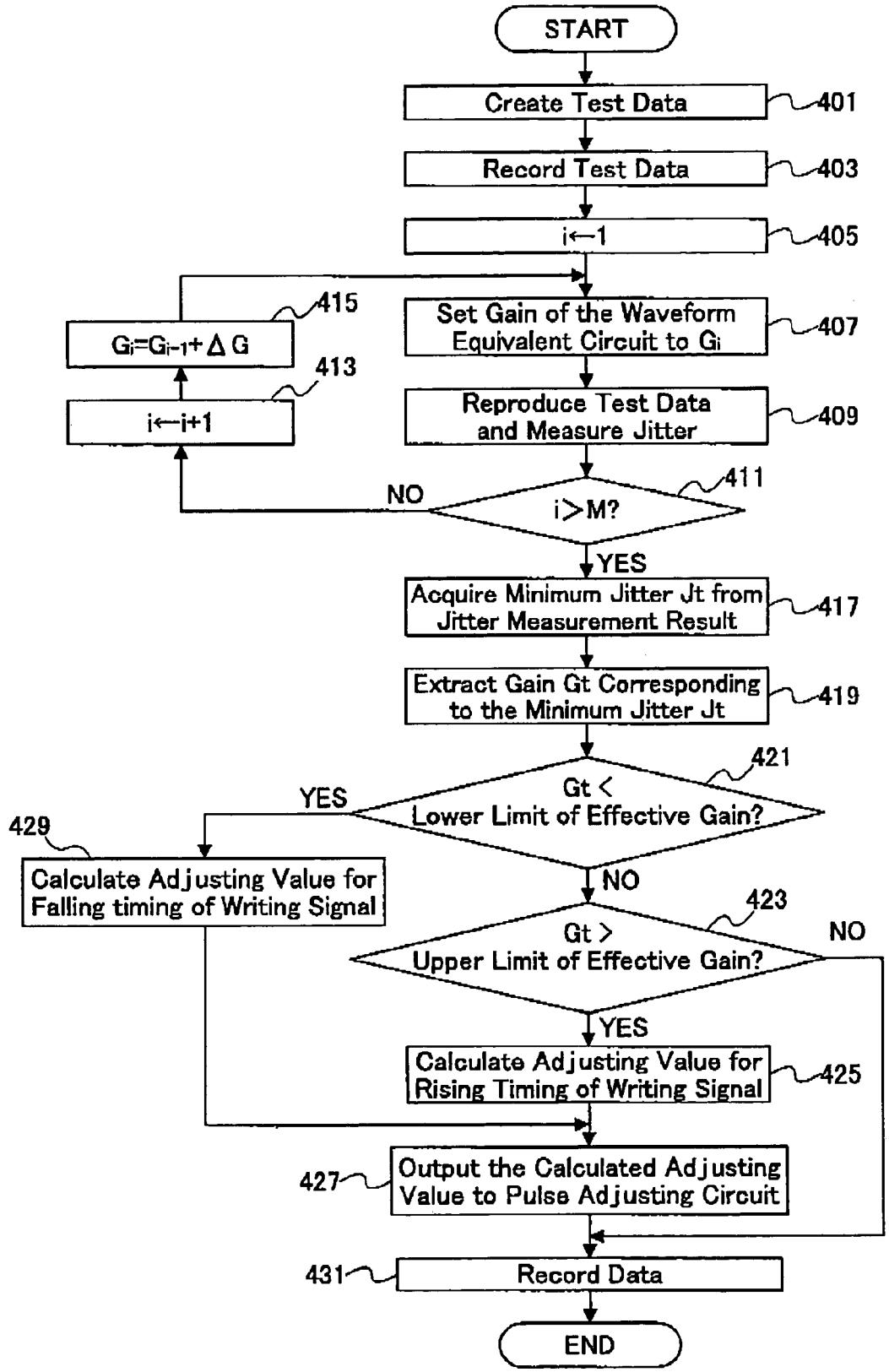
FIG. 8 is a flowchart showing the pulse shape adjusting operation of the optical disk apparatus according to an embodiment of the invention.

The process performed in response to a recording command supplied from the host is described with reference to FIG. 8. The process illustrated in the flowchart of FIG. 8 corresponds to a sequence of the processing algorithm carried out by the CPU 40. Upon receiving the recording command from the host, the leading address of the program corresponding to the flowchart of FIG. 8 is set in the program counter of the CPU 40, and the process starts.

First, in step 401, test data are created such that mark regions and space regions with lengths 3T through 14T are formed. The test data may be created in advance, and stored in the data area of the ROM 39 or in the RAM 41. Then, in step 403, recording conditions are set based on the recording condition information stored in the data region of the ROM 39, and the test data are recorded in the test writing area on the optical disk 15.

Then, in step 405, the counter value i indicating the number of times the gain is set for the waveform equivalent circuit d3, is set to "1" for initialization. In step 407, the gain of the waveform equivalent circuit d3 is set to Gi (in this case, G1). In the embodiment, the gain of the waveform equivalent circuit d3 is incremented from G1 to G(M+1) by a predetermined stepsize $\Delta G$.

Next, in step 409, the test data recorded in the test writing area of the optical disk 15 is reproduced, and jitter is measured by the jitter measuring circuit 28i. The measurement result is saved in the RAM 41 in association with the gain Gi of the waveform equivalent circuit d3.

Next, in step 411, it is determined whether the value of the counter i is greater than a predetermined value M ($M \geq 2$). Since the counter value "i" has been set to "1", the determination result in step 411 is negative (that is, the "i" is not greater than M), and the process proceeds to step 413, in which the counter value "i" is incremented by 1.

In step 415, the gain set for the waveform equivalent circuit d3 is increased by $\Delta G$, and the process returns to step 407. The steps 407 through 415, via steps 409, 411, and 413, are repeated until the determination result in step 411 becomes positive. When the counter value "i" is greater than M (YES in S411), then the process proceeds to step 417. In step 417, the minimum jitter is acquired from among the measurement results of jitter stored in the RAM 41. It is assumed that the minimum jitter value Jt is acquired in this step.

Then, in step 419, the gain St that corresponds to the minimum jitter Jt is extracted from RAM 41, which stores the jitter measurement results in association with the gain of the waveform equivalent circuit d3.

Next, in step 421, it is determined whether the extracted gain Gt is less than the lower limit of the prescribed effective range of gain. If the gain Gt is greater than or equal to the lower limit of the effective gain (NO in S421), then the process proceeds to step 423. In this embodiment, the lower limit of the effective gain is set Wlo 50.

In step 423, it is determined whether the gain Gt is greater than the upper limit of the effective gain. If the gain Gt is greater than the upper limit of the effective gain (YES in S423), the process proceeds to step 425. In this embodiment, the upper limit of the effective gain is set to 55.

Figure 9A:
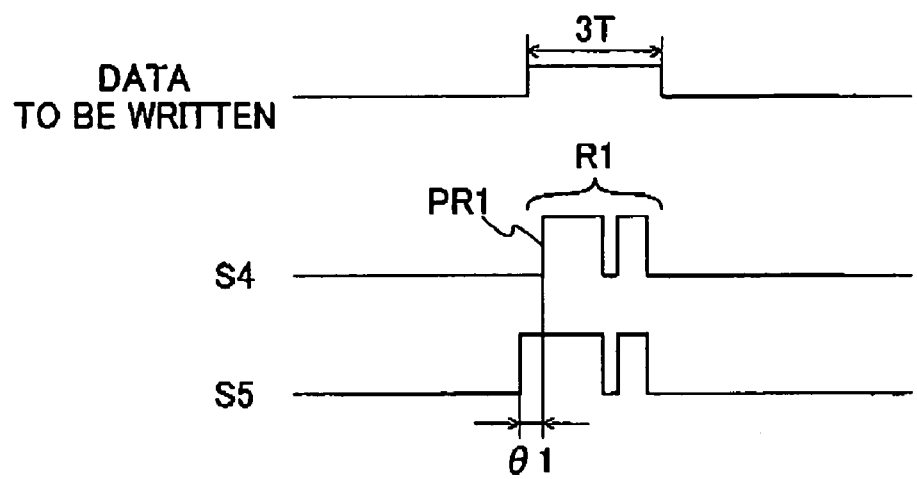
FIG. 9A and FIG. 9B are timing charts for explaining the calculation of an adjusting value for the rising timing of the writing signal (carried out in step 425 of FIG. 6)
Figure 9B:
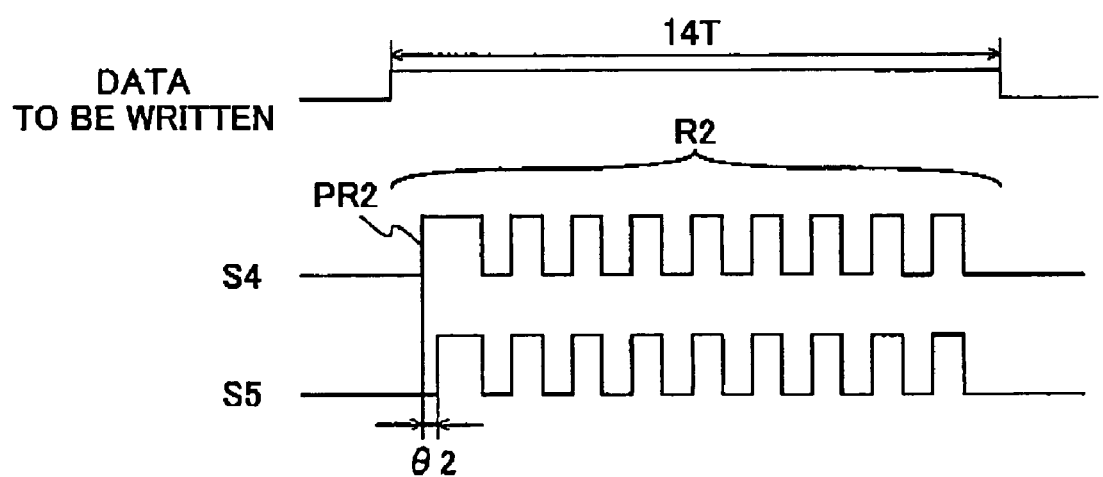

In step 425, a rising timing adjusting value is calculated for the writing signal, based on the difference between the gain Gt and the upper limit of the effective gain, by referring to a pulse shape modulation table stored in the ROM 39. In this example, at least one of a rising timing adjusting value θ1 for advancing the rising timing of the leading pulse PR1 of the pulse sequence R1 contained in the writing signal S4 from the encoder 25 to form a mark region with length 3T, as illustrated in FIG. 9A, and a rising timing adjusting value θ2 for delaying the rising timing of the leading pulse PR2 of the pulse sequence R2 forming a mark region with length 14T, as illustrated in FIG. 9B, are calculated. Then, the process proceeds to step 427.

For instance, if the gain Gt is 65.0, a rising pulse adjusting value θ1=0.1T and/or θ2=0.1T is obtained as the calculation result. If the difference between the gain Gt and the upper limit of the effective gain is large, the rising timing of the leading pulse of the pulse sequence for forming each of the mark regions with length 3T and 14T may be slightly advanced. For example, if the gain Gt is 75.0, then the rising timing of the leading pulse of the pulse sequence for forming the mark region with length 3T may be further advanced by 0.2T. At the same time, the rising timing of the leading pulse of the pulse sequence for forming the mark region with 14T may be advanced by 0.1T.

In step 427, a signal containing the information about each of the rising timing adjusting values is output as pulse adjusting signal S3 to the pulse adjusting circuit 24*b*. By this pulse adjusting signal S3, a new recording condition is set. Then, the process proceeds to step 431.

In step 431, the user data transmitted from the host are recorded in the designated portion of the recording area under the newly set recording condition. The details of the recording operation of the optical disk apparatus 20 are described below. When the user data have been recorded, the operation under the recording command is completed.

Figure 10A:
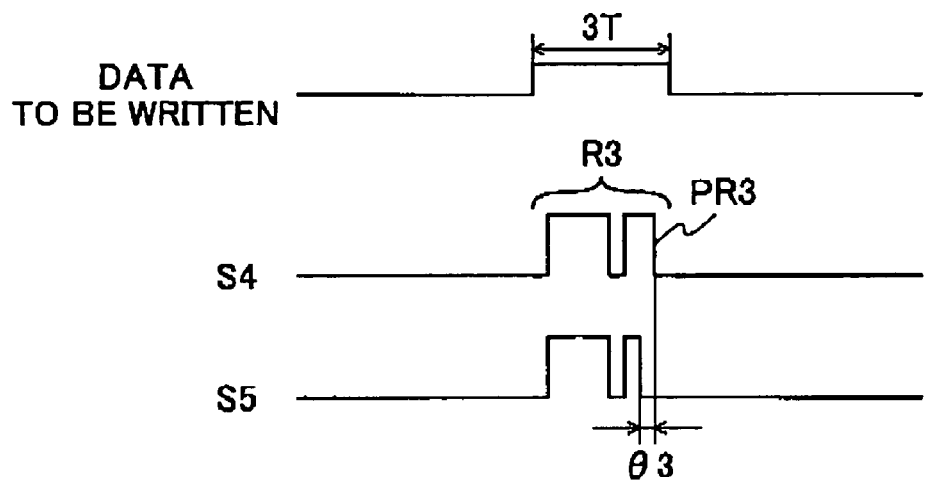
FIG. 10A and FIG. 10B are timing charts for explaining the calculation of an adjusting value for the falling timing of the writing signal (carried out in step 429 of FIG. 8)
Figure 10B:
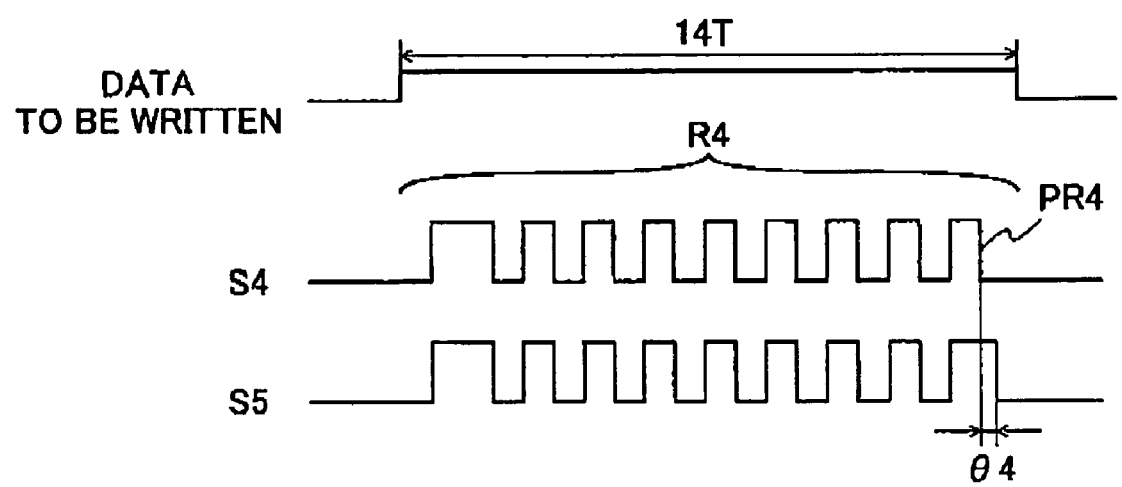

On the other hand, if the gain Gt is less than than the lower limit of the effective gain in step 421 (YES in S421), then the process proceeds to step 429 to calculate an adjusting value of the pulse falling timing. To be more precise, in step S429, a falling timing adjusting value for the writing signal is calculated, based on the difference between the gain T and the lower limit of the effective gain, while referring to the pulse shape modulation table stored in the ROM 39. In this example, at least one of a falling timing adjusting value θ3 for advancing the falling timing of the last pulse PR3 of the pulse sequence R3 contained in the writing signal S4 from the encoder 25 to form a mark region with length 3T, as illustrated in FIG. 10A, and a falling timing adjusting value θ4 for delaying the falling timing of the last pulse PR4 of the pulse sequence R4 forming a mark region with length 14T, as illustrated in FIG. 10B, are calculated. Then, the process proceeds to step 427.

For instance, if the gain Gt is 40.0, a falling pulse adjusting value θ3=0.1T and/or θ4=0.1T is obtained as the calculation result. If the difference between the gain Gt and the lower limit of the effective gain is large, the falling timing of the last pulse of the pulse sequence for forming each of the mark regions with length 3T and 14T may be slightly advanced. For example, if the gain Gt is 35.0, then the falling timing of the last pulse of the pulse sequence for forming the mark region with length 3T may be further advanced by 0.2T. At the same time, the falling timing of the last pulse of the pulse sequence for forming the mark region with 14T may be advanced by 0.1T.

In step 427, a signal containing the information about each of the falling timing adjusting values is output as pulse adjusting signal S3 to the pulse adjusting circuit 24*b*. By this pulse adjusting signal S3, a new recording condition is set. Then, the process proceeds to step 431.

In step 431, the user data transmitted from the host are recorded in the designated portion of the recording area under the newly set recording condition. When the recording of the user data is finished, the operation under the recording command is completed.

If in step 423 the gain GT is less than or equal to the upper limit of the effective gain (NO in S423), then the process jumps to step 431, and the user data supplied from the host are recorded in the designated portion of the recording area. In this case, the basic recording strategy is used as it is. When the user data have been recorded, the operation under the recording command is completed.

Next, the recording operation of the optical disk apparatus 20 is explained CPU 40 outputs a control signal for controlling the rotation of the spindle motor 22 to the motor driver 27, based on the designated recording speed. At the same time, the CPU reports the receipt of the recording command from the host to the reproduced signal processing circuit 28. The CPU also instructs the buffer manager 37 to store the user data supplied from the host in buffer RAM 34.

When rotation of the optical disk 15 has reached a prescribed linear velocity, the above-described focus control and tracking control are performed. The reproduced signal processing circuit 28 acquires ADIP information every predetermined time, and supplies the ADIP information to the CPU 40.

The CPU 40 outputs a signal for controlling the seek motor of the optical pickup device 23 to the motor driver 27, based on the ADIP information, in order to bring the optical pickup device 23 to the writing start position. When the CPU 40 receives a signal from the buffer manager 37 indicating that the amount of the user data accumulated in the buffer RAM 34 has exceeded the prescribed level, the CPU 40 instructs the encoder 25 to start generating a writing signal.

When the optical pickup device 23 has been positioned at the wiring start position, the CPU 40 informs the encoder 25 of the positioning of the optical pickup device 23. Then, the user data are recorded in the optical disk 15 via the encoder 25, the laser control circuit 24, and the optical pickup device 23.

In the reproducing operation of the optical disk apparatus, the CPU 40 outputs a control signal for controlling the rotation of the spindle motor 22 to the motor driver 27, based on the reproducing speed, and at the same time, reports the receipt of a playback command to the reproduced signal processing circuit 28.

When the rotation of the optical disk has produced a prescribed linear velocity, focus control and tracking control are performed. The reproduced signal processing circuit 28 acquires ADIP information every prescribed time, and supplies the ADIP information to the CPU 40.

The CPU 40 outputs a signal for controlling the seek motor of the optical pickup device 23 to the motor driver 27, based on the ADIP information, such that the optical pickup device 23 is positioned at the reading start position. When the optical pickup device 23 has reached the reading start position, the CPU 40 reports the positioning of the optical pickup device 23 to the reproduced signal processing circuit 28.

The reproduced signal processing circuit 28 detects RF signals, as has been described above, and stores the RF signals as reproduced data in buffer RAM 34 after demodulation and error correction have been carried out. When the amount of reproduced data accumulated in the buffer RAM 34 reaches a prescribed level sufficient to form sector data, the buffer manager 37 transfers the reproduced data to the host via the interface 38.

The focus control and the tracking control are performed as required until the recording operation and the reproducing operation are finished.

In the embodiment, the gain acquiring means, the pulse shape modulation means, and the recording means may be implemented by the CPU 40 and a program executed by the CPU 40. The gain acquiring means are implemented by carrying out steps 401 through 419 shown in FIG. 8. The pulse shape modulation means osare implemented by carrying out steps 421, 423, 425, and 429. The recording means are implemented by carrying out steps 427 and 431 shown in FIG. 8. However, the present invention is not limited to these examples. The above descried structure and operations only exemplify the present invention, and at least a portion or all of the configuration realized by the computer program executed by the CPU 40 may be constituted by a hardware structure.

As has been discussed above, with the pulse shape adjusting method according to the embodiment, it is determined whether the gain for amplitude adjustment of the reproduced signal that makes the jitter become the minimum resides within the prescribed range. If the gain corresponding to the minimum jitter is not within the prescribed range, then the shape of the light-emitting pulse is adjusted based on this gain. In other words, the pulse shape of the laser beam emitted from the light source during the recording operation is adjusted such that a satisfactory reproduced signal with lesser degradation can be obtained in a stable manner during the reproducing process. Consequently, the optimum light emitting pulse can be produced, which is suitable for the stable recording operation resulting in superior recording quality.

According to the embodiment, if the gain that makes the jitter substantially the minimum is greater than the upper limit of the effective gain, the rising timing of the pulse for forming the mark region with length 3T (i.e., the shortest mark region) is advanced to adjust the pulse shape, while the rising timing of the pulse for forming the mark region with length 14T (i.e., the longest mark regions) is delayed to adjust the pulse shape. When the information recorded using the timing-adjusted light emitting pulse is reproduced, signal degradation can be prevented during the waveform equivalent process of that reproduced signal.

In addition, if the gain that makes the jitter substantially the minimum is less than the lower limit of the effective gain, the falling timing of the pulse for forming the mark region with length 3T is advanced to adjust the pulse shape, while the falling timing of the pulse for forming the mark region with length 14T is delayed to adjust the pulse shape. In reproducing the information recorded by the timing-adjusted light emitting pulse from the optical disk, signal degradation of the reproduced signal can be prevented during the waveform equivalent process.

Since information is recorded based on the optimum shape of light emitting pulses, in accordance with the recording characteristics of the optical disk, the recording operation can be carried out in a stable manner resulting in high recording quality. The pulse shape modulation carried out for the pulse forming a mark region with length 14T may also be applicable to other pulses for forming mark regions with length 6T or longer.

Figure 11A:
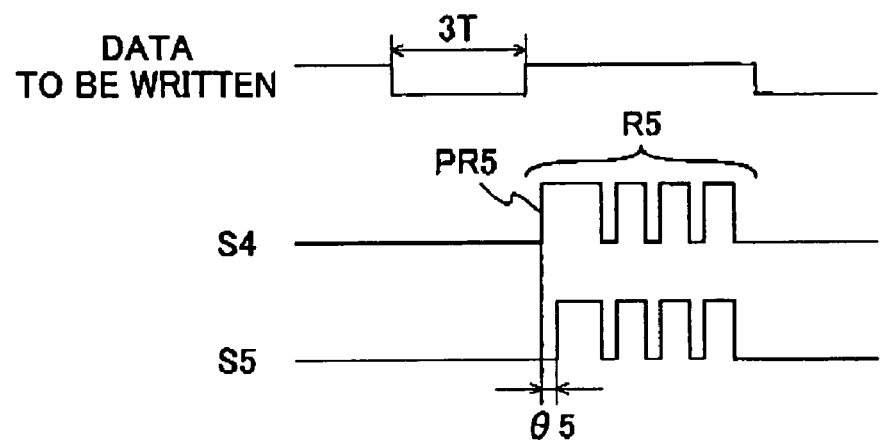
FIG. 11A and FIG. 11B are timing charts for explaining the first modification of calculation of an adjusting value for the falling timing of the writing signal.
Figure 11B:
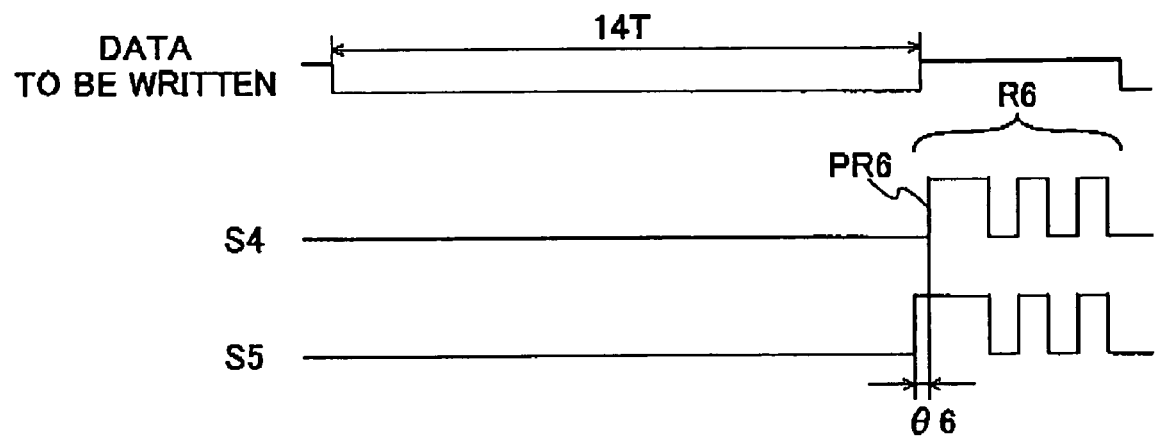

In the embodiment, when the gain Gt is less than the lower limit of the effective gain, the pulse shape modulation is performed on the writing signal that forms a mark region with length of at least one of 3T and 14T (see step 429 of FIG. 8). However, the invention is not limited to this example. For example, with the gain Gt less than the lower limit of the effective gain, the pulse shape modulation may be performed on a pulse that forms a mark region located immediately after a space (which is referred to as a "front space") with length of at least one of 3T and 14T. In this case, the pulse shape is modulated as illustrated in FIG. 11A and FIG. 11B. In FIG. 11A., a rising pulse adjusting value θ5 for delaying the rising timing of the leading pulse PR5 of the pulse sequence R5, which is contained in the writing signal S4 supplied from the encoder 25 to form the mark region with a front space with length 3T, is calculated. On the other hand, in FIG. 11B, a rising pulse adjusting value θ6 for advancing the rising timing of the leading pulse PR6 of the pulse sequence R6 for forming the mark region with a front space with length 14T is calculated. In this manner, at least one of θ5 and θ6 may be calculated when the gain GT is less than the lower limit of the effective gain.

For example, if the gain Gt is 40.0, at least one of θ5=0.1T and θ6=0.1T is obtained. If the difference between the gain Gt and the lower limit of the effective gain is large, the rising timing of the leading pulse of the pulse sequence for forming the mark region with a front space of length 3T or 14T may be slightly delayed. For example, if the gain Gt is 35.0, then the rising timing of the leading pulse of the pulse sequence for forming the mark region with a front space of length 3T may be delayed by 0.2T, while the rising timing of the leading pulse of the pulse sequence for forming the mark region with a front space of length 14T may be delayed by 0.1T.

Figure 12A:
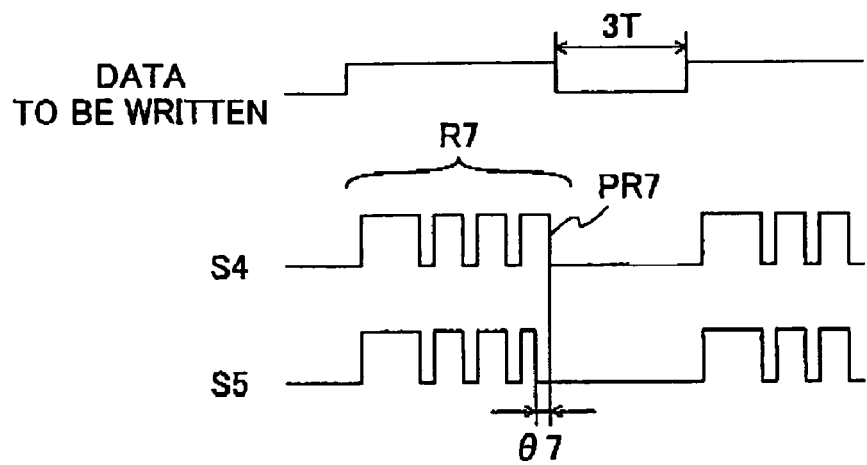
FIG. 12A and FIG. 12B are timing charts for explaining the second modification of calculation of an adjusting value for the falling timing of the writing signal.
Figure 12B:
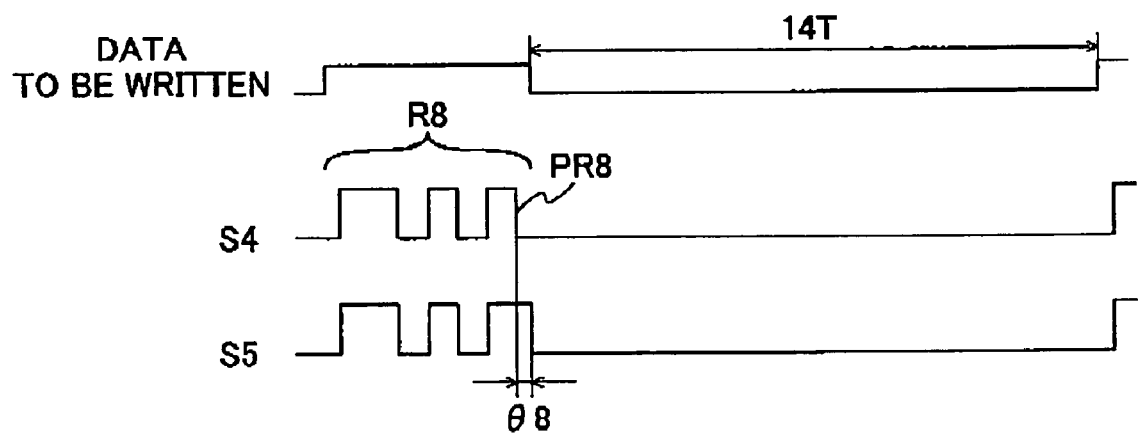

In addition, if the gain Gt is less than the lower limit of the effective gain, the pulse shape modulation may be performed on the writing signal that forms a mark region located immediately before a space (which is referred to as a "back space") with length of at least 3T and 14T. In this case, the pulse shape is modulated as illustrated in FIG. 12A and FIG. 12B. In FIG. 12A, a falling pulse adjusting value θ7 for advancing the falling timing of the last pulse PR7 of the pulse sequence R7, which is contained in the writing signal S4 supplied from the encoder 25 to form the mark region with a back space with length 3T, is calculated. On the other hand, in FIG. 12D, a falling pulse adjusting value θ8 for delaying the falling timing of the last pulse PR8 of the pulse sequence R8 for forming the mark region with a back space with length 14T is calculated. In this manner, at least one of θ7 and θ8 may be calculated when the gain GT is less than the lower limit of the effective gain.

For example, if the gain Gt is 40.0, at least one of θ7=0.1T and θ8=0.1T is obtained. If the difference between the gain Gt and the lower limit of the effective gain is large, the falling timing of the last pulse of the pulse sequence for forming the mark region with a back space of length 3T or 14T may be slightly advanced. For example, if the gain Gt is 35.0, then the falling timing of the last pulse of the pulse sequence for forming the mark region with a back space of length 3T may be advanced by 0.2T, while the falling timing of the last pulse of the pulse sequence for forming the mark region with a back space of length 14T may be advanced by 0.1T.

Although the invention has been described using the example of a DVD+R optical disk, the invention is not limited to this example, but applicable to any information recording medium in which information is recorded using a pulsed laser beam.

As the material of organic dye contained in the recording layer of such an information recording medium, phthalocyanine type dyes, cyanine type dyes, polymethine type dyes, anthraquinone pigment, naphthalocyanine type dyes, xanthene type dyes, triphenylmethane type dyes, pyrylium type dyes, azulene type dyes, metal-containing azo color, and azo color may be used. In particular, among these, dicarbocyanine derivative, phthalocyanines, naphthalocyanine derivative, cyanine derivative, azo color derivative, and formazan type pigments are preferred. Dye pigments in which various quenchers, such as aminium dyes, are added can also be used. In addition, a resin in which one or a mixture of dye materials selected from the above-listed dye materials is dispersed may be used as the material of the recording layer. Examples of such dye-dispersible resins include acrylic resin, vinyl resin, phenol resin, fluororesin, silicone resin, polyamide resin, and cellulosic resin.

Examples of a solvent for pigment materials, which is used to apply those pigment materials onto the substrate of the information recording medium, include alcohol solvent and Cellosolve type solvent. In addition, an inorganic acid, a chelate material with bidentate ligand, such as thioether, dicarboxylic acid, oxycarbonic acid, dihydric compound, oxyoxime, oxyaldehyde and its derivative, diketone and similar compounds, oxychinone, troboron, N-oxide chemical compound, amino carboxylic acid and similar compounds, hydroxyl amine, oxine, aldimine, oxyoxime, oxyazo chemical compounds, nitrosonaphthol, toriazen, piuret, formazan, dithizone, bikarido, glyoxime, diamine and similar chemical compounds, and hydrazine derivatives, may be contained. Furthermore, derivatives having an imino group (imide or amide) can be employed.

Although the embodiment has been described using a single light source structure, the invention is not limited to this example.

With the above-described pulse modulation method, the optimum pulse can be produced, which is suitable for stable recording operation and satisfactory recording quality.

The information recording and reproducing apparatus making use of the pulse modulation method can also achieve the same advantages.

This patent application is based on and claims the benefit of the earlier filing date of Japanese Patent Application No. 2002-375779 filed Dec. 26, 2002, the entire contents of which are hereby incorporated by reference.

The invention claimed is:

1. A pulse shape modulation method for modulating a pulse shape of a pulsed laser beam used in recording operations for an information recording medium, based on the jitter of a reproduced signal from the information recording medium, the method comprising:
    specifying an amplitude modulation gain for the reproduced signal that makes the jitter the minimum;
    determining whether the amplitude modulation gain corresponding to the minimum jitter resides within a prescribed range; and
    modulating the pulse shape of the pulsed laser beam when the amplitude modulation gain corresponding to the minimum jitter is outside the prescribed range.

2. The method of claim 1, wherein if the amplitude modulation gain is greater than the upper limit of the prescribed range, at least one of the shape of a pulse used to form a shortest mark region and the shape of a pulse used to form a longest mark region is modulated.

3. The method of claim 2, wherein when modulating the shape of the pulse used to form the, shortest mark region, the rising timing of the pulse is advanced.

4. The method of claim 2, wherein when modulating the shape of the pulse used to form the longest mark region, the rising timing of the pulse is delayed.

5. The method of claim 1, herein if the amplitude modulation gain is less than the lower limit of the prescribed range, at least one of the shape of a pulse used to form a shortest mark region and the shape of a pulse used to form a longest mark region is modulated.

6. The method of claim 5, wherein when modulating the shape of the pulse used to form the shortest mark region, the falling timing of the pulse is advanced.

7. The method of claim 5, wherein when modulating the shape of the pulse used to form the longest mark region, the falling timing of the pulse is delayed.

8. The method of claim 1, herein if the amplitude modulation gain is less than the lower limit of the prescribed range, at least one of the shape of a pulse used to form a mark region located immediately after a shortest space region and the shape of a pulse used to form a mark region located immediately after a longest space region is modulated.

9. The method of claim 8, wherein when modulating the shape of the pulse located immediately after the shortest space region, the rising timing of the pulse is delayed.

10. The method of claim 8, wherein when modulating the shape of the pulse located immediately after the longest space region, the rising timing of the pulse is advanced.

11. The method of claim 1, herein if the amplitude modulation gain is less than the lower limit of the prescribed range, at least one of the shape of a pulse used to form a mark region located immediately before a shortest space region and the shape of a pulse used to form a mark region located immediately before a longest space region is modulated.

12. The method of claim 11, wherein when modulating the shape of the pulse located immediately before the shortest space region, the falling timing of the pulse is advanced.

13. The method of claim 11, wherein when modulating the shape of the pulse located immediately before the longest space region, the falling timing of the pulse is delayed.

14. The method of claim 1, wherein the amplitude modulation gain is a gain for selectively modulating the amplitude of a signal component contained in the reproduced signal and corresponding to the shortest mark region formed in the information recording medium.

15. The method of claim 1, wherein the information recording medium has a recording layer in which an organic dye is contained.

16. An information recording method for recording information in an information recording medium using a pulsed laser beam, comprising:
    specifying an amplitude modulation gain for a reproduced signal of test data from the information recording medium that makes the jitter the minimum;
    determining whether the amplitude modulation gain corresponding to the minimum jitter resides within a prescribed range;

modulating the pulse shape of the pulsed laser beam when the amplitude modulation gain corresponding to the minimum jitter is outside the prescribed range; and recording the information in the information recording medium using the pulse modulated laser beam.

17. An information recording and reproducing apparatus for recording information in an information recording medium using a pulsed laser beam, comprising:

a reproduced signal processing circuit that acquires an amplitude modulation gain for a reproduced signal from the information recording medium that makes the jitter of the reproduced signal become the minimum;

a laser control circuit that modulates a pulse shape of the pulsed laser beam when the amplitude modulation gain corresponding to the minimum jitter is not within a prescribed range, and an optical pickup that records the information in the information recording medium using the pulse-modulated laser beam.

18. An information recording and reproducing apparatus for recording information in an information recording medium using a pulsed laser beam, comprising:

gain acquiring means for acquiring an amplitude modulation gain for a reproduced signal from the information recording medium that makes the jitter of the reproduced signal become the minimum;

pulse shape modulation means for modulating a pulse shape of the pulsed laser beam when the amplitude modulation gain corresponding to the minimum jitter is not within a prescribed range, and recording means for recording the information in the information recording medium using the pulse-modulated laser beam.

* * * * *